US009045871B2

(12) United States Patent
Graham et al.

(10) Patent No.: US 9,045,871 B2
(45) Date of Patent: Jun. 2, 2015

(54) PAVING MACHINE WITH OPERATOR DIRECTED SAVING AND RECALL OF MACHINE OPERATING PARAMETERS

(71) Applicant: Caterpillar Paving Products Inc., Brooklyn Park, MN (US)

(72) Inventors: Luke E. Graham, Maple Grove, MN (US); Rick L. Mings, Andover, MN (US); Jameson M. Smieja, Mound, MN (US); Toby A. Frelich, St. Michael, MN (US); Igor S. Ramos, Minnetonka, MN (US); Anthony P. Steinhagen, Minneapolis, MN (US); Jason W. Kopacz, St. Louis Park, MN (US); Chad M. Thiesse, Brooklyn Park, MN (US); Ryan T. Thiesse, Otsego, MN (US); Bradley D. Anderson, Rogers, MN (US); Daniel D. Podany, Peoria, IL (US); Kea V. Chin, Washington, IL (US)

(73) Assignee: Caterpillar Paving Products Inc., Brooklyn Park, MN (US)

(*) Notice: Subject to any disclaimer, the term of this patent is extended or adjusted under 35 U.S.C. 154(b) by 0 days.

(21) Appl. No.: 13/775,839

(22) Filed: Feb. 25, 2013

(65) Prior Publication Data
US 2014/0186115 A1   Jul. 3, 2014

Related U.S. Application Data

(60) Provisional application No. 61/746,365, filed on Dec. 27, 2012.

(51) Int. Cl.
*E01C 19/42*   (2006.01)
*E01C 19/48*   (2006.01)
(Continued)

(52) U.S. Cl.
CPC ............ *E01C 19/4873* (2013.01); *G01K 11/22* (2013.01); *E01C 23/07* (2013.01); *E01C 2301/16* (2013.01)

(58) Field of Classification Search
CPC ..... E01C 19/42; E01C 19/4873; E01C 23/07; E01C 2301/16; G01K 11/22; G05B 1/00
USPC ....................... 404/84.05–84.8, 118
See application file for complete search history.

(56) References Cited

U.S. PATENT DOCUMENTS 5,393,167 A   2/1995 Fujita et al.
5,401,115 A   3/1995 Musil et al.
(Continued)

FOREIGN PATENT DOCUMENTS

CN   201581339   9/2010
DE   9416667 U1   12/1994
(Continued)

*Primary Examiner* — Raymond W Addie
(74) *Attorney, Agent, or Firm* — Leydig, Voit & Mayer, Ltd.

(57) ABSTRACT

A paving machine including an adjustable screed assembly is provided. Actuators adjust the screed assembly into the plurality of different configurations. Sensors sense a respective configuration parameter indicative of the configuration of the screed assembly. A controller is configured to save a first set of parameters including the configuration parameters and save a second set of parameters including the configuration parameters in response. The controller is configured to recall one of the first set or second set of parameters, and adjust automatically the configuration of the screed assembly to correspond to the configuration parameters included in the recalled first set or second set of parameters.

20 Claims, 4 Drawing Sheets

(51) Int. Cl.
*E01C 23/07* (2006.01)
*G01K 11/22* (2006.01)

(56) References Cited

U.S. PATENT DOCUMENTS

| | | | |
|---|---|---|---|
| 5,631,658 A | 5/1997 | Gudat et al. | |
| 5,908,459 A * | 6/1999 | Rower et al. | 701/50 |
| RE39,834 E * | 9/2007 | Kieranen et al. | 404/84.5 |
| 7,584,007 B2 | 9/2009 | Eul | |
| 7,946,787 B2 | 5/2011 | Glee et al. | |
| 8,099,218 B2 | 1/2012 | Glee et al. | |
| 8,371,769 B2 * | 2/2013 | Worsley et al. | 404/84.2 |
| 2007/0044088 A1 | 2/2007 | Eul | |
| 2009/0226255 A1 * | 9/2009 | Lossow | 404/84.5 |
| 2010/0150650 A1 * | 6/2010 | Buschmann et al. | 404/82 |
| 2010/0178107 A1 * | 7/2010 | Braddy et al. | 404/75 |

FOREIGN PATENT DOCUMENTS

| | | |
|---|---|---|
| DE | 29516666 U1 | 12/1995 |
| DE | 19624027 A1 | 12/1997 |
| DE | 19800238 C1 | 8/1999 |
| DE | 20010498 U1 | 9/2000 |
| EP | 1544354 A2 | 6/2005 |

* cited by examiner

PAVING MACHINE WITH OPERATOR DIRECTED SAVING AND RECALL OF MACHINE OPERATING PARAMETERS

TECHNICAL FIELD

This patent disclosure relates generally to paving machines and, more particularly, to a system for automatically performing one or more set-up functions for a screed assembly of a paving machine.

BACKGROUND

Paving machines are used to apply, spread and compact paving a "mat" of material relatively evenly over a desired surface. These machines are regularly used in the construction of roads, parking lots and other areas where a smooth durable surface is required for cars, trucks and other vehicles to travel. An asphalt paving machine generally includes a hopper for receiving asphalt material from a truck and a conveyor system for transferring the asphalt rearwardly from the hopper for discharge onto a roadbed. Screw augers may be used to spread the asphalt transversely across the roadbed in front of a screed plate. The screed plate smoothes and somewhat compacts the asphalt material and ideally leaves a roadbed of uniform depth and smoothness.

In order to help achieve the desired uniform depth and smoothness as well as to accommodate different job site conditions and different desired roadbed configurations, the screed assembly can include a variety of adjustments. These adjustments can be used to vary, for example, the width and thickness of the mat as well as the degree of any crown. However, these adjustments can make setting up a screed assembly at the start of a new operation a time consuming and labor intensive process, leading to inefficiencies. Moreover, the set-up of the screed assembly can be relatively complicated, which can lead to errors in the set-up. These errors can result in defects in the mat such as inconsistencies or discontinuities in the compression of the mat and in the thickness, texture, density and smoothness of the mat.

SUMMARY

In one aspect, the disclosure describes a paving machine including a screed assembly configured to be adjustable into a plurality of different configurations. A plurality of actuators are supported and configured to adjust the screed assembly into the plurality of different configurations. A plurality of sensors are each configured to sense a respective configuration parameter indicative of the configuration of the screed assembly. A controller is in communication with the sensors and configured to control operation of the actuators. The controller is configured to save a first set of parameters including the configuration parameters in memory in response to a first save command and save a second set of parameters including the configuration parameters in response to a second save command. The controller is configured to recall one of the first set or second set of parameters from memory in response to a first recall command, and adjust automatically the configuration of the screed assembly to correspond to the configuration parameters included in the recalled first set or second set of parameters.

In another aspect, the disclosure describes a paving machine including a screed assembly configured to be adjustable into a plurality of different configurations. A plurality of actuators are supported and configured to adjust the screed extension into the plurality of different configurations. A plurality of sensors are included with each configured to sense a respective configuration parameter indicative of the configuration of the screed. A controller is in communication with the sensors and configured to save a first set of parameters in memory. The first set of parameters includes a plurality of configuration parameters sensed by the sensors. The controller is configured to recall the first set of parameters from memory and automatically adjust the screed assembly using one or more of the plurality of actuators into a configuration that corresponds to the configuration parameters in the saved first set of parameters.

In yet another aspect, the disclosure describes a method of operating a paving machine including a screed assembly having an adjustable configuration. A plurality of configuration parameters indicative of the configuration of the screed assembly of the paving machine are sensed. A first set of parameters including the configuration parameters are saved in memory in response to a first save command. A second set of parameters including the configuration parameters are saved in memory in response to a second save command. One of the first set or second set of parameters are recalled from memory in response to a first recall command. The configuration of the screed assembly is automatically adjusted to correspond to the configuration parameters included in the recalled first set or second set of parameters.

DETAILED DESCRIPTION

Figure 1:
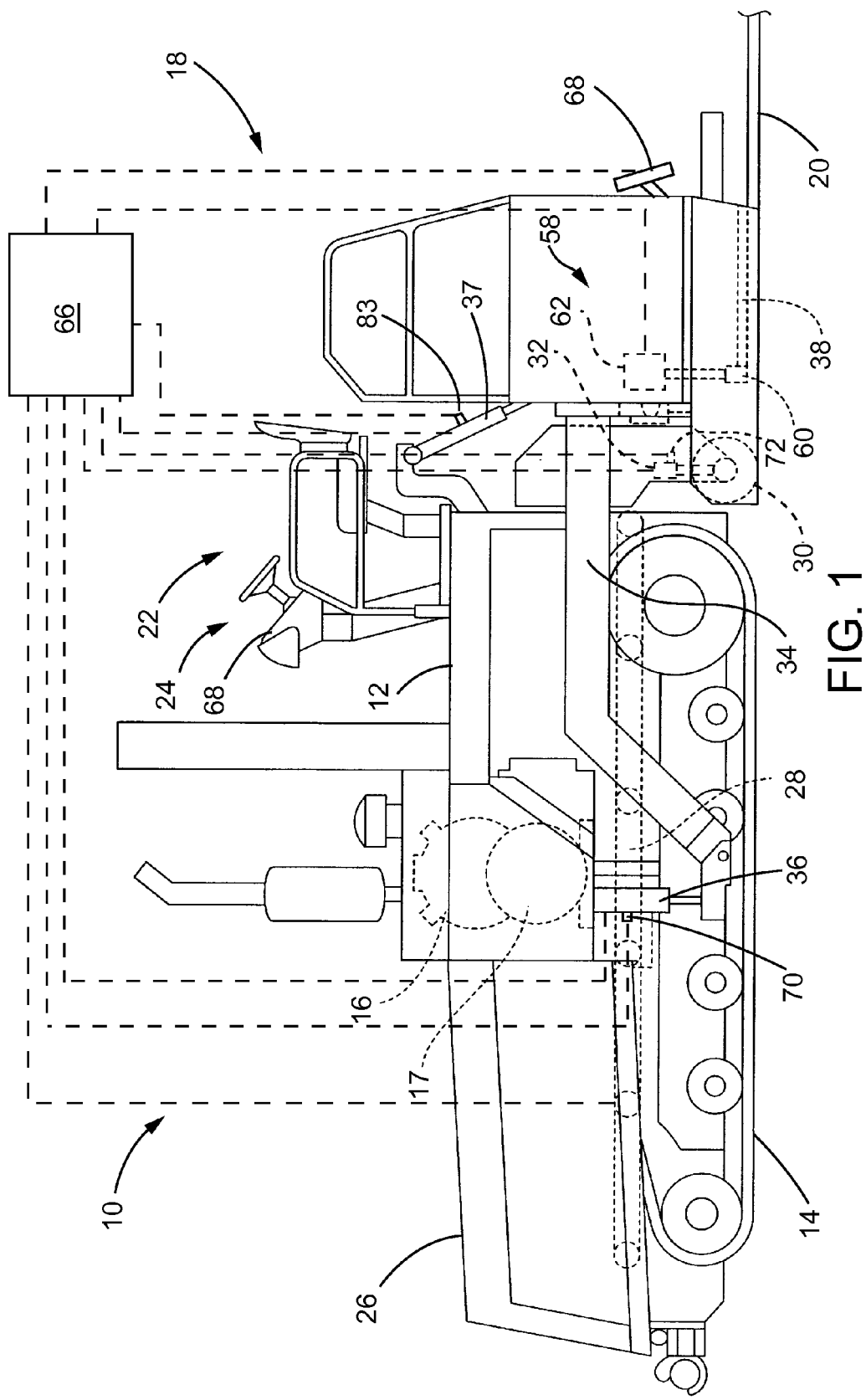
FIG. 1 is a diagrammatic side view of an asphalt paving machine towing a screed assembly in accordance with the present disclosure.

This disclosure generally relates to paving machines. More specifically, certain disclosed embodiments are configured to automate the performance of one or more set-up functions for a screed assembly of a paving machine. Referring to FIG. 1, a paving machine 10 is shown that includes a frame 12 with a set of ground-engaging elements 14, such as wheels or tracks, coupled with the frame 12. The ground engaging elements 14 may be driven by an engine 16 in a conventional manner. The engine 16 may further drive an associated generator 17 that can be used to power various systems on the paving machine 10. A screed assembly 18 may be attached at the rear end of the paving machine 10 to spread and compact paving material into a layer or mat 20 of desired thickness, size and uniformity on a paving surface. The paving machine 10 may also include an operator station 22 having a seat and a console 24, which may include various controls for directing operations of the paving machine.

The paving machine 10 may further include a hopper 26 adapted for storing a paving material, and a conveyor system including one or more conveyors 28 configured to move paving material from the hopper 26 to the screed assembly 18 at the rear of the paving machine 10. The conveyors 28 may be arranged at the bottom of the hopper 26 and, if more than one is provided, may be positioned side-by-side and run parallel to one another back to the rear of the paving machine. The speed of the one or more conveyors 28 may be adjustable in order to control the rate at which paving material may be delivered to the screed assembly 18. More specifically, the height of the pile of paving material delivered to the screed assembly 18 may be increased or decreased by varying the conveyor speed relative to the speed at which the paving machine 10 is traveling. To the extent that more than one conveyor 28 is provided, the speed of each conveyor 28 may be independently variable in order to adjust the amount of paving material delivered to each side of the screed assembly 18. While an endless path conveyor is shown, one or more feed augers or other material feed components may be used instead of or in addition to the conveyor.

One or more augers 30 may be arranged near the forward end of the screed assembly 18 to receive the paving material supplied by the conveyor 28 and spread the material evenly beneath the screed assembly 18. Although only one auger 30 is shown in FIG. 1, the paving machine 10 may have a single auger or any number of augers. If the paving machine 10 includes multiple augers 30, the augers may be aligned end-to-end, and situated crossways within the screed assembly 18. To the extent multiple augers 30 are provided, each auger may be independently controlled in order to control the output of paving machine 10. For example, differing auger settings may be used to compensate for imbalances in the delivery of paving material to the screed assembly 18 or even to create desired imbalances in the output of the paving machine 10.

The height of the auger 30 may also be adjustable via one or more height actuators 32. The height adjustment actuators 32 for the auger 30 may be any suitable actuator, such as, for example, hydraulic cylinders. The auger height may be adjusted in order to position the auger 30 at the proper height to sufficiently spread the paving material. For example, if the auger 30 is too high, the paving material may not be sufficiently spread and the screed assembly 18 may not be able to smooth it out completely. On the other hand, if the auger 30 is too low, it may disrupt the paving material such that there may not be enough material for the screed assembly 18 to smooth and compact.

As shown in FIG. 1, the screed assembly 18 may be pivotally connected behind the paving machine 10 by a pair of tow arms 34 (only one of which is visible in FIG. 1) that extend between the frame 12 of the paving machine and the screed assembly 18. The tow arms 34 are pivotally connected to the frame 12 such that the relative position and orientation of the screed assembly 18 relative to the frame, and the surface being paved, may be adjusted by pivoting the tow arms 34 in order, for example, to control the thickness of paving material deposited via the paving machine 10. To this end, tow arm actuators 34 may be provided that are arranged and configured to raise and lower the tow arms 32 and thereby raise and lower the screed assembly 18. The tow arm actuators 34 may be any suitable actuators, such as, for example, hydraulic cylinders. To provide further control over the paving process, screed lift cylinders 37 may be provided that are configured such that the hydraulic pressure in the lift side of actuators, which can be referred to as the screed assist pressure, is adjustable during the paving process in order to allow the downward force applied by the screed assembly 18 to be varied.

Figure 2:
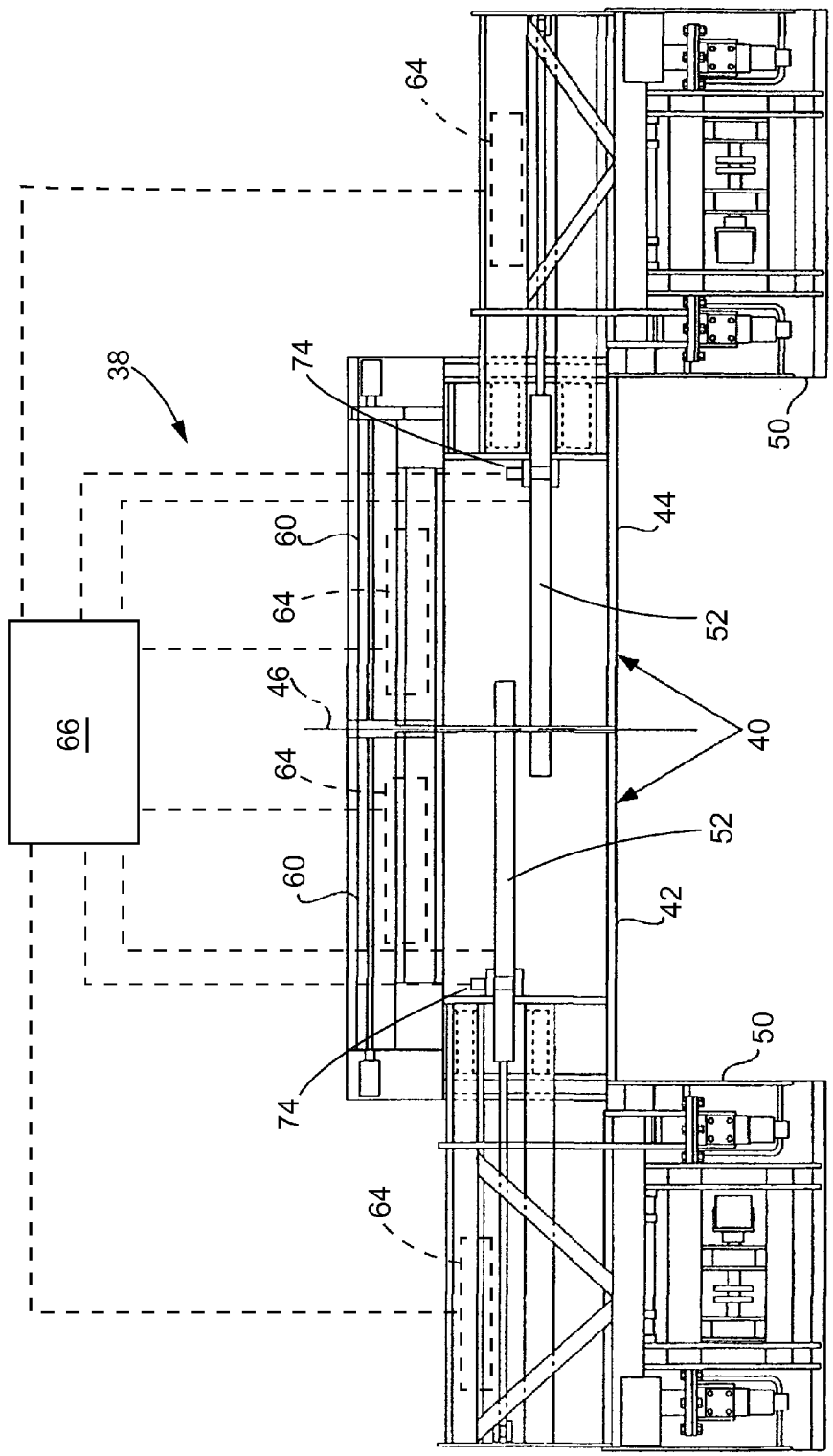
FIG. 2 is a plan view of the screed assembly of FIG. 1.

The screed assembly 18 may be any of a number of configurations known in the art such as a fixed width screed, screed extender or a multiple section screed that includes extensions. As shown in FIG. 2, the screed assembly 18 may be provided with a screed plate 38 including a main screed section 40 with a left and a right screed section 42, 44. The left and right screed sections 42, 44 are connected to one another along a longitudinal centerline 46 in a manner so as to be capable of being disposed at a slight angle relative to each other in order to execute a crowning of the paved road surface about the centerline or various other operations. A crown actuator 48 (see FIG. 3), such as a hydraulic or other suitable actuator, may be provided that is arranged and configured so as to be able to pivot the left and right screed sections 42, 44 relative to each other about the centerline 46 to produce the desired crown.

Figure 3:
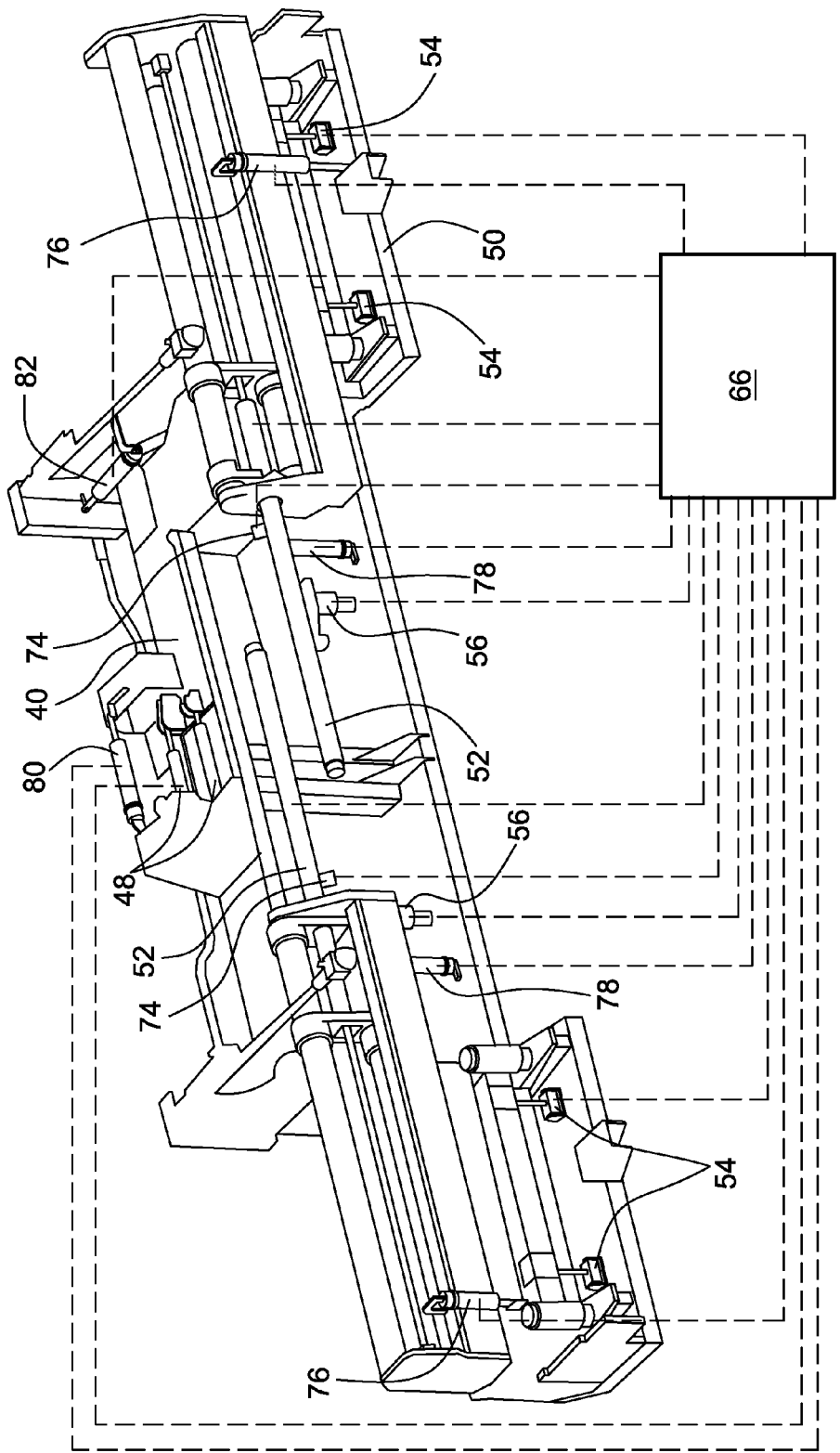
FIG. 3 is a perspective view of the screed assembly of FIG. 1

As further shown in FIG. 2, a screed extension 50 may be provided behind and adjacent to each of the left and right screed sections 42, 44, although the screed extensions 50 also may be positioned in front of the main screed section 40. The screed extensions 50 are slidably movable laterally relative to the main screed section 40 between refracted and extended positions so that varying widths of paving material can be laid. As shown in FIGS. 2 and 3, the lateral movement of the extensions 50 relative to the main screed section 40 may be driven by respective powered screed width actuators 52, such as hydraulic or electric actuators. In addition to being movable laterally relative to the main screed section 40, the screed extensions 50 may also be configured and supported such their height and slope can be adjusted relative to the surface being paved. As shown in FIG. 3, the height of the screed extensions 50 and the slope of the screed extensions 50 may be adjusted by respective powered height actuators 54 and slope actuators 56 (one of which can be seen in FIG. 3 with the other being similarly arranged with respect to the respective screed width actuator), such as hydraulic or electric actuators. The method by which a screed assembly 18 can be adjusted to control the height of the upper surface of the paving material is well known.

The screed assembly 18 may also include a tamper bar assembly 58 positioned forward of the main screed section 40 and extending transversely to the direction of travel of the paving machine 10, as shown in FIG. 1, to provide some compaction of the paving material before it is engaged by the screed plate 38. The tamper bar assembly 58 may include a tamper bar 60 that may be an elongated generally rectangular member with a generally flat paving material engagement surface along a lower edge thereof. The tamper bar 60 may be supported so as to be movable up and down so as to be able strike the surface of the paving material after it is deposited by the auger 30. This upward and downward movement of the tamper bar 60 may be powered by a tamper bar drive mechanism 62 that includes one or more tamper drive members operatively connected to the tamper bar 60 that are configured to be driven by one more eccentric sections of a drive shaft. To further aid in compaction of the paving material, the screed assembly 18 may include vibratory mechanisms 64 (shown schematically in FIG. 2) that can be arranged on the upper side of the screed plate 38, including the screed extensions 50, and configured to drive a vibratory movement of the screed plate 38.

The tamper bar drive mechanism 62 and/or the vibration mechanisms 64 may be configured such that the various characteristics associated with the movement of the tamper bar 60 may be adjusted to account for different paving thicknesses, materials and other jobsite conditions. For example, the speed at which the tamper bar 60 moves and the tamper speed ratio (i.e., the ratio of the tamper bar speed to the paving speed) may be adjustable. Additionally, to help ensure a smooth consistent mat, the starting and stopping ramp rates (i.e., the time to accelerate the tamper bar to the desired speed and the time to decelerate the tamper bar 60 from the desired speed to stopped) of the tamper bar 60 may also be variable so as to allow for adjustment to different paving conditions. The vibratory mechanisms 64 also may be configured such that the frequency at which they vibrate the screed plate 38 may be varied.

To coordinate and control the various systems and components associated with the paving machine 10 including the screed assembly 18, an electronic or computerized control unit, module or controller 66 may be provided. The controller 66 may be adapted to monitor various operating parameters and to responsively regulate various variables and functions affecting operation of the paving machine. The controller 66 can include a microprocessor, an application specific integrated circuit ("ASIC"), or other appropriate circuitry and can have memory or other data storage capabilities. The controller 66 can include functions, steps, routines, data tables, data maps, charts and the like saved in and executable from read only memory to control the paving machine. Although in FIGS. 1-3, the controller 66 is illustrated as a single, discrete unit, in other embodiments the controller and its functions may be distributed among a plurality of distinct and separate components. To receive operating parameters and send control commands or instructions, the controller 66 can be operatively associated with and can communicate with various sensors and controls on the paving machine 10 as described in greater detail below. Communication between the controller 66 and the sensors can be established by sending and receiving digital or analog signals across electronic communication lines or communication busses, including by wireless communication. In FIGS. 1-3, the various communication and command channels are indicated in dashed lines for illustration purposes.

In order to allow operators of the paving machine 10 to enter and receive information concerning operation of the paving machine, one or more user interfaces 68 may be provided that are in communication with the controller 66. For the convenience of operators, the user interfaces 68 may be located at various different locations on the paving machine 10. For example, a user interface 68 may be provided at the operator station 22 so as to be accessible to an operator sitting in the operator station and one or more additional user interfaces 68 may be arranged at a lower position on the screed assembly 18 (see FIG. 1) so as to be accessible to users standing on the ground or rear walkway.

Each user interface 68 may include one or more input devices for changing settings of the paving machine 10. The input devices may be any type of input apparatus including keypads, touch screens, dials, knobs, switches, wheels, etc. and any combination thereof. The settings of the paving machine 10 for which a user may input information through an input device may include paving machine speed, conveyor speed, auger speed, auger height, tow arm position, screed width, extender height, extender slope, crown position, tamper speed, tamper ramp rates, tamper speed ratio, vibration frequency of the vibration mechanism and any other setting desired to be changed on the paving machine or the screed assembly. For example, an operator may choose each setting from a predetermined range of values. In addition, some settings may be linked to one another. For example, conveyor speed and auger speed may be linked such that the ratio between the two speeds may be adjusted by an operator. The screed height and auger height may also be linked to one another in a similar manner. Alternatively, or in addition, these settings may be indirectly linked to the input device. For example, user interface 68 may include an input specifically for setting a desired output of a paving machine function, such as pile height. By selecting a particular pile height, conveyor speed could automatically be set to a value that, given the current paving machine speed, would produce the desired pile height.

One or more of the user interfaces 68 may also include a display. The display may be any kind of display suitable for showing information to an operator of the paving machine 10. For example, the controller 66 may be configured to determine paving output data such as mat thickness, mat smoothness, mat temperature, mat elevation, and mat cross-slope from information it receives from various sensors associated with the paving machine 10. The controller 66 may send signals to the display for displaying settings, as well as information recorded from the sensors on the paving machine 10.

As will be appreciated, the number and location of user interfaces 68 can vary depending on the size and configuration of the paving machine 10. Moreover, the input devices included and information provided on the displays at the individual user interfaces can vary depending on the size and configuration of the paving machine. For example, operators may only be able to enter certain information regarding operation of the paving machine at particular user interfaces including during certain operating modes of the paving machine 10.

To monitor and control the various different possible adjustments to the configuration of the screed assembly 18, the controller 66 may communicate with various sensors on the screed assembly 18. For example, the controller 66 may communicate with one or more tow arm position sensors 70 that monitor the position of the tow arms 34 as well as one or more auger position sensors 72 that monitor the vertical position of the auger 30 (see FIG. 1). Additionally, as shown in FIG. 3, the controller 66 may communicate with various sensors associated with the screed extensions 50 attached to the main screed section 40 including, for example, one or more screed width sensors 74 that monitor the distance at which the screed extensions 50 are extended in the lateral direction relative to the main screed section 40, one or more extender height sensors 76 that monitor the vertical position of the screed extensions 50 and one or more extender slope sensors 78 that monitor the angular orientation of the screed extensions 50 relative to the main screed section 40 in the lateral direction. The controller 66 may also communicate with one or more crown position sensors 80 that monitor the relative orientation of the left and right sections 42, 44 of the main screed section 40 with respect to the centerline 46. Additional angle of attack sensors 82 (one of which can be seen in FIG. 3 with an identical one being provided on the opposing side of the screed assembly) also may be provided for any thickness adjustment mechanism provided for the main screed section. Typically, the thickness adjustment mechanism includes a hand crank operated linkage that is operable to pivot the main screed section 40 and thereby change its pitch or angle of attack. Alternatively, the thickness adjustment could be powered by an actuator, such as a hydraulic or electric actuator. In addition to receiving information from these sensors, the controller 66 may also communicate with and be configured to control the actuators that drive these adjustments including the tow arm actuators 36, the auger height actuators 32, the screed width actuators 52, the screed extender height actuators 54, the screed extender slope actuators 56 and the crown actuator 48 as shown in FIG. 3.

To provide further control over the paving process, the controller 66 may be in communication with the tamper drive mechanism 62 and the vibratory mechanisms 64. More specifically, the controller 66 may be configured so as to monitor and control various parameters of the tamper drive mechanism 62 including, for example, tamper speed, tamper ramp rates and tamper speed ratio. Additionally, the controller 66 may be in communication with and be configured to monitor and control operation of the vibration mechanism including parameters such as vibration frequency. The controller 66 may also be in communication with the drive systems for the conveyors 28 and the auger 30 and be configured to monitor and control operation the speed of the conveyors 28 in the hopper 26 and the speed of the auger 30 in order to adjust parameters such as mix height.

In order to make set-up of the screed assembly 18 prior to the start of a new paving operation (e.g., a new job site or a new mat pull) quicker and easier, the controller 66 may be configured to save one or more sets of parameters associated with the set-up of the paving machine 10. For example, the controller 66 may be configuration such that the set of saved parameters includes one or more configuration parameters that are indicative of a configuration of the screed assembly 18 as sensed by one or more sensors on the screed assembly 18. For example, the controller 66 may be configured to save the set of configuration parameters that are being used for the screed assembly 66 during a particular paving operation including one or more of the tow arm position, auger height, crown position, screed width, extender height and/or extender slope based on the readings from their respective sensors. The controller 66 may also be configured such that the saved set of parameters includes a set of operation parameters indicative of an operating state of the paving machine 10. These operation parameters may be based on the controller's monitoring of one more operating systems of the paving machine including the conveyors 28, augers 30, the tamper drive mechanism 62, the vibration mechanism 64 or any other electronically controlled system requiring adjustment during the paving process. For example, the operation parameters that may be saved by the controller 66 may include conveyor speed, mix height, tamper speed, tamper ramp rates, tamper speed ratio and vibration frequency. The saving of the set of parameters, both the configuration and the operation parameters, may be initiated via a save command entered, for example, by an operator through an input device provided at one of the user interfaces 68 on the paving machine 10.

The controller 66 may also be configured to save more than one set of configuration and operation parameters. In such a case, the controller 66 may be configured to assign a different identifier to each saved set of parameters in order to simplify recall of the data. For storing the sets of configuration parameters, the controller 66 may include access memory or secondary storage devices. The memory and secondary storage devices may be in the form of read-only memory (ROM) or random access memory (RAM) or integrated circuitry that is accessible by the controller 66.

The controller 66 may further be configured to recall the saved sets of parameters from memory in response to a recall command and then use those parameters to automatically adjust the set-up of the paving machine 10 such that it corresponds to the saved parameters. More particularly, upon recall of the configuration parameters associated with the screed assembly 18, the controller may automatically direct the various actuators associated with each of the saved first configuration parameters to perform any adjustments in the configuration of the screed assembly 18 that are necessary to make the set-up of the screed assembly match the saved parameters. For example, depending upon the starting configuration of the screed assembly 18 this may include automatic adjustments to one or more of the auger height, tow arm position, screed width, extender height, extender slope and crown position. The automatic adjustment may be facilitated by the respective sensors including the tow arm position sensors 70, the screed width sensors 74, the extender height sensors 76, extender slope sensors 78 and the crown position sensor 80.

Upon recall of the operation parameters relating to the operating state of the paving machine 10, the controller 66 may automatically direct any adjustments of the various systems on the paving machine necessary to match the saved parameters. For example, this may include automatic adjustment of the conveyors 28 and augers 30 to match the saved mix height parameter, automatic adjustment of the tamper drive mechanism 62 to match the saved tamper speed, tamper ramp rate or tamper speed ratio parameters, automatic adjustment of the vibration system 64 to match the saved vibration frequency or automatic adjustment of the pressure of the screed lift actuator 37, which may be facilitated by a screed assist pressure sensor 83 to match the saved screed assist pressure parameter.

The controller 66 also may be configured to include or associate with the saved sets of parameters one or more default parameters that also can be recalled and used to automatically set-up the configuration of the screed assembly 18. For example, the stored default parameters may be one or more configuration or operation parameters that are preprogrammed into the controller 66 because they are considered to be most appropriate for a particular type of paving operation.

As with the saving of the parameters, the operator may recall and apply the saved set of parameters by entering the recall command, for example, via an input device provided at one of the user interfaces 68. To the extent more than one set of parameters has been saved, the operator may recall the desired set of parameters using the assigned identifier.

Industrial Applicability

The present disclosure is applicable to paving machines that include an adjustable screed assembly. Because much of the set-up procedures can be automated when using saved set-up parameters, the disclosed control system and method can substantially shorten set-up times for the paving machine, for example, when an operator encounters job site conditions that are similar to those encountered previously. Moreover, the automatic performance of certain set-up procedures that is possible when recalling job site or paving application specific settings with the disclosed control system and method simplifies the set-up process, reducing the potential for set-up errors.

Figure 4:
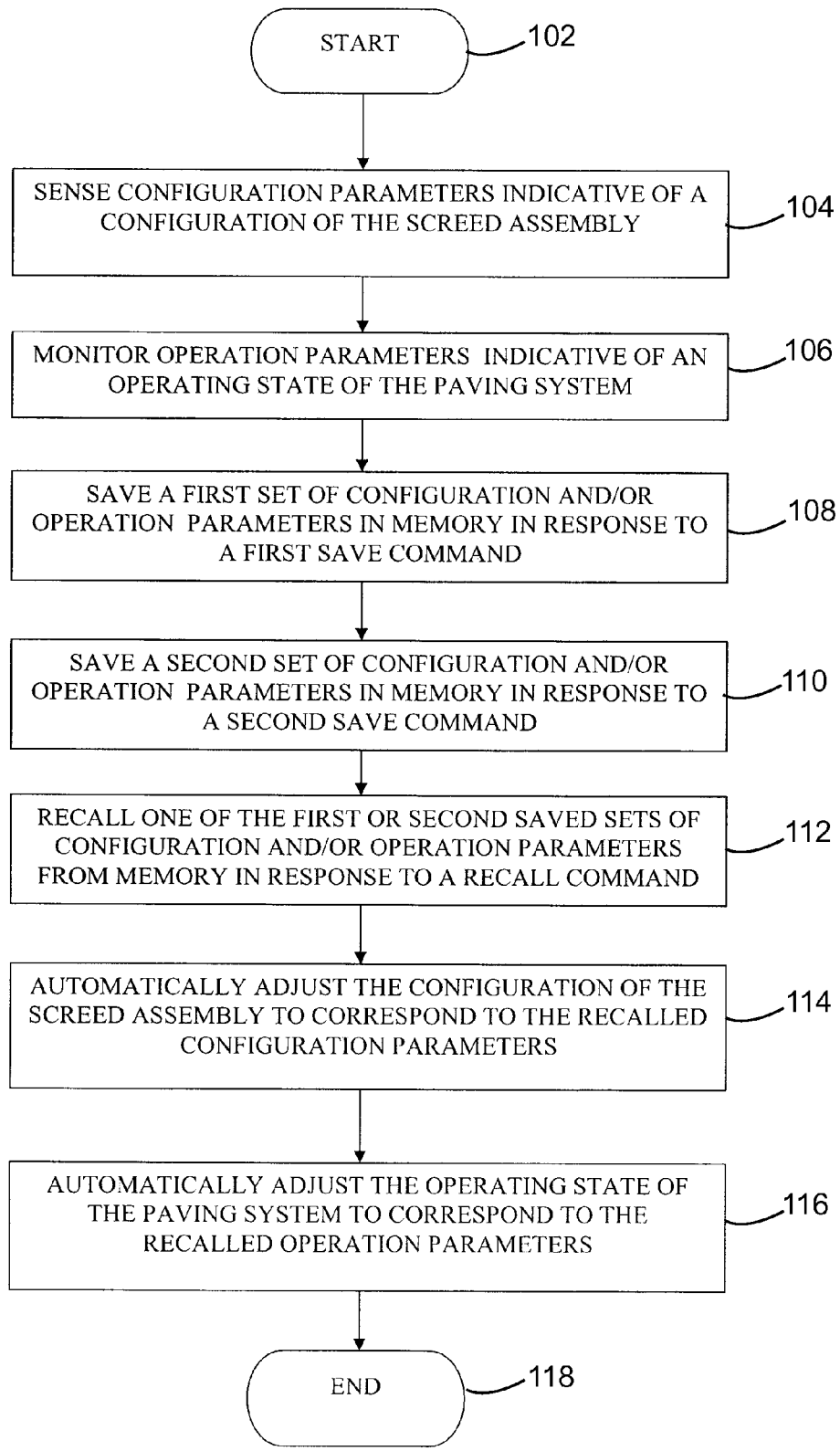
FIG. 4 is a flow chart for a method of operating a paving machine in accordance with the disclosure.

FIG. 4 provides a representative flow chart of one method of operating a paving machine according to the present disclosure. After starting at 102, the disclosed method may include the step 104 of sensing configuration parameters indicative of a configuration of the screed assembly 18. These configuration parameters may include tow arm position, crown position, extender height, extender slope, screed width and auger height. In addition to sensing the configuration parameters, the disclosed method may also include the step of monitoring operation parameters indicative of an operating state of the paving machine 10 at step 106. These operation parameters may include the settings for conveyor and auger mix height, tamper speed, tamper ramp rate, tamper speed ratio, vibration frequency, screed assist pressure, paver speed, proportional extender controls (e.g. modulation and speed) and the screed control lockout button configuration. Steps 104 and 106 do not have to be performed in any particular order and may occur simultaneously.

Next, in response to a first save command, a first set of parameters, including one or more of the configuration parameters and/or operation parameters sensed or monitored in steps 104 and 106, may be saved in memory in step 108. The operator may initiate the saving of the parameters when the particular parameters currently being used on the screed assembly 18 or other systems of the paving machine 10 may be useful on later job sites or during later paving operations.

As noted previously, the steps of sensing, monitoring and saving (104, 106, 108) can be repeated with multiple sets of parameters being saved in memory with each set of parameters having a respective identifier. For example, as shown in step 110 of FIG. 4, a second set of parameters, including one or more of the configuration and/or operation parameters sensed or monitored in steps 104 and 106, may be saved in memory in response to a second save command. It will be appreciated that the saved first and second sets of parameters may include only configuration parameters or only operation parameters or some combination of both types of parameters.

In step 112, one of the saved first or second saved sets of parameters may be recalled from memory in response to a recall command. If multiple sets of parameters are stored in memory, the operator can recall the desired set of parameters using the respective identifier. Next, the configuration of the screed assembly 18 may be adjusted automatically to correspond to the configuration parameters in the recalled set of parameters in step 114. Additionally, in step 116, the operating state of the paving machine 10 may be automatically adjusted to correspond to the operation parameters in the recalled set of parameters before the method ends at step 118. It will be appreciated that steps 114 and 116 can be performed in any particular order or simultaneously. Moreover, it will be appreciated that the disclosed paving machine and method is not limited to the saving and recall of any particular parameters.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

We claim:

1. A paving machine comprising:
   a screed assembly having a plurality of adjustable components, the plurality of adjustable components being configured to adjust the screed assembly into a plurality of different configurations;
   a plurality of actuators, each actuator being associated with a respective adjustable component of the screed assembly and being supported and configured to adjust the respective adjustable component into different configurations;
   a plurality of sensors each configured to sense a configuration parameter of a respective adjustable component of the screed assembly indicative of the configuration of the respective adjustable component; and
   an operator input device configured to allow an operator of the paving machine to enter a first save command, a second save command and a recall command; and
   a controller in communication with the operator input device and the sensors and configured to control operation of the actuators, the controller being configured to:
      save in memory in response to the first save command a first set of the configuration parameters sensed by the plurality of sensors and corresponding to the configurations of the adjustable components of the screed assembly that exist at the time of entry of the first save command in association with a first paving operation;
      save in memory in response to the second save command a second set of the configuration parameters sensed by the plurality of sensors and corresponding to the configurations of the adjustable component of the screed assembly then being used that exist at the time of entry of the second save command in association with a second paving operation;
      recall one of the first set or second set of the configuration parameters from memory in response to the recall command in association with a third paving operation; and
      adjust automatically the adjustable components of the screed assembly in associate with the third paving operation to correspond to the configuration parameters included in the recalled first set or second set of the configuration parameters.

2. The paving machine of claim 1 wherein the controller is further configured to monitor a plurality of operation parameters indicative of an operating state of the paving machine and to save the plurality of operation parameters that exist at time of entry of the first save command in response to the first save command and that exist at time of entry of the second save command in response to the second save command.

3. The paving machine of claim 2 wherein the controller is further configured to automatically adjust the paving machine to correspond to the saved operation parameters in response to the recall command.

4. The paving machine of claim 3 wherein the operation parameters include parameters indicative of an operating state of a tamper bar drive mechanism.

5. The paving machine of claim 1 wherein the screed assembly is pivotally connected to a frame of the paving machine by a pair of tow arms and the plurality of adjustable components includes the tow arms, wherein the plurality of actuators includes a pair of tow arm actuators each configured and supported to pivot a respective tow arm; wherein the plurality of sensors includes a tow arm position sensor configured and arranged to sense a position of one or both of the tow arms and wherein the configuration parameters include a position of one or both of the tow arms.

6. The paving machine of claim 1 wherein the screed assembly includes a pair of laterally movable screed extensions each extending from an opposing side of a main screed section and the plurality of adjustable components includes the screed extensions, wherein the plurality of actuators includes screed width actuators each configured and supported to laterally move a respective screed extension, wherein the plurality of sensors include screed width sensors each configured and arranged to sense a width of the screed assembly as defined by lateral positions of each of the screed extensions and wherein the configuration parameters include the width of the screed assembly.

7. The paving machine of claim 1 wherein the screed assembly includes a pair of screed extensions each extending laterally from an opposing side of a main screed section and being configured and supported such that a height and a slope of each extension is adjustable relative to the main screed section and the plurality of adjustable components includes the screed extensions, wherein the plurality of actuators includes a height actuator and a slope actuator for each of the respective screed extensions, wherein the plurality of sensors include an extender height sensor associated with each screed extension each configured and arranged to sense the height of the respective screed extension and an extender slope sensor associated with each screed extension each configured and arranged to sense the slope of the respective screed extension and wherein the configuration parameters include the height and the slope of each of the screed extensions.

8. The paving machine of claim 1 wherein the screed assembly is pivotable about a centerline so as to provide an adjustable crown position and the plurality of adjustable components include the pivotable screed assembly, wherein the plurality of actuators include a crown position actuator for pivoting the screed assembly about the centerline, wherein the plurality of sensors includes a crown position sensor configured and arranged to sense the crown position and wherein the configuration parameters include the crown position.

9. A paving machine comprising:
an operator input device configured to allow an operator of the paving machine to enter a first save command and a recall command;
a screed assembly having a plurality of adjustable components, each of the plurality of adjustable components being configured to be adjustable into different configurations;
a plurality of actuators, each actuator being associated with a respective adjustable component of the screed assembly and being supported and configured to adjust the respective adjustable component into different configurations;
a plurality of sensors each configured to sense a configuration parameter of a respective adjustable component of the screed assembly indicative of the configuration of the respective adjustable component; and
a controller in communication with the operator input device and the sensors and configured to save in memory in response to the first save command a first set of the configuration parameters sensed by the plurality of sensors and corresponding to the configurations of the adjustable components of the screed assembly that exist at the time of entry of the first save command in association with a first paving operation, the controller being configured to recall the first set of the configuration parameters from memory in response to the recall command entered through the operator input device and automatically adjust the adjustable components of the screed assembly using the respective actuators into a configuration that corresponds to the configuration parameters in the saved first set of the configuration parameters.

10. The paving machine of claim 9 wherein the screed assembly includes a pair of laterally movable screed extensions each extending from an opposing side of a main screed section and the plurality of adjustable components includes the screed extensions, wherein the plurality of actuators includes screed width actuators each configured and supported to laterally move a respective screed extension, wherein the plurality of sensors include screed width sensors each configured and arranged to sense a width of the screed assembly as defined by lateral positions of each of the screed extensions and wherein the configuration parameters include the width of the screed assembly.

11. The paving machine of claim 9 wherein the screed assembly includes a pair of screed extensions each extending laterally from an opposing side of a main screed section and being configured and supported such that a height and a slope of each extension is adjustable relative to the main screed section and the plurality of adjustable components includes the screed extensions, wherein the plurality of actuators includes a height actuator and a slope actuator for each of the respective screed extensions, wherein the plurality of sensors include an extender height sensor associated with each screed extension each configured and arranged to sense the height of the respective screed extension and an extender slope sensor associated with each screed extension each configured and arranged to sense the slope of the respective screed extension and wherein the configuration parameters include the height and the slope of each of the screed extensions.

12. The paving machine of claim 9 wherein the screed assembly is pivotable about a centerline so as to provide an adjustable crown position and the plurality of adjustable components includes the pivotable screed assembly, wherein the plurality of actuators include a crown position actuator for pivoting the screed assembly about the centerline, wherein the plurality of sensors includes a crown position sensor configured and arranged to sense the crown position and wherein the configuration parameters include the crown position.

13. A method of operating a paving machine including a screed assembly having a plurality of adjustable components comprising the steps of:
sensing a plurality of configuration parameters each indicative of a respective configuration of one of the adjustable components of the screed assembly of the paving machine during a paving operation;
saving in memory a first set of the sensed configuration parameters corresponding to the configurations of the adjustable components of the screed assembly that exist at the time of entry of a first save command by an operator of the paving machine in association with a first paving operation;
saving in memory a second set of the sensed configuration parameters corresponding to the configurations of the adjustable components of the screed assembly that exist at the time of entry of a second save command by an operator of the paving machine in association with a second paving operation in response to a second save command entered by an operator of the paving machine;
recalling one of the first set or second set of the sensed configuration parameters from memory in response to a first recall command entered by an operator of the paving machine;
adjusting automatically the adjustable components of the screed assembly using associated actuators to correspond to the configuration parameters included in the recalled first set or second set of the sensed configuration parameters; and
operating the paving machine in a third paving operation with the screed assembly having the recalled first or second set of the sensed configuration parameters.

14. The method of claim 13 further including the step of monitoring a plurality of operation parameters indicative of an operating state of the paving machine and wherein the steps of saving the first set of parameters and second set of parameters further includes saving the plurality of operation parameters that exist at the time of entry of the first save command and at the time of entry of the second save command.

15. The method of claim 14 wherein the configuration of the screed assembly is automatically adjusted to correspond to the saved operation parameters in response to the first and second recall commands.

16. The method of claim 15 wherein the operation parameters include parameters indicative of an operating state of a tamper bar drive mechanism.

17. The method of claim 13 wherein the screed assembly is pivotally connected to a frame of the paving machine by a pair of tow arms and the plurality of adjustable components includes the tow arms, and wherein the configuration parameters include a position of the tow arms.

18. The method of claim 17 wherein the screed assembly includes a pair of laterally movable screed extensions each extending from an opposing side of a main screed section and wherein the plurality of adjustable components includes the screed extensions, and wherein the configuration parameters include a width of the screed assembly as defined by lateral positions of each of the screed extensions.

19. The method of claim 18 wherein the screed assembly includes a pair of screed extensions extending laterally from a main screed section, the screed extensions being configured and supported such that a height and a slope of each extension is adjustable relative to a main screed section and wherein the plurality of adjustable components includes the screed extensions, and wherein the configuration parameters include the height and the slope of each of the screed extensions.

20. The method of claim 19 wherein the screed assembly is pivotable about a centerline so as to provide an adjustable crown position, the plurality of adjustable components includes the pivotable screed assembly and the configuration parameters include the crown position.

* * * * *